May 13, 1930.    F. PORSCHE    1,758,533
DYNAMO ELECTRIC DRIVING SET FOR VEHICLES
Filed July 20, 1923    5 Sheets-Sheet 1

Inventor
Ferdinand Porsche

May 13, 1930.   F. PORSCHE   1,758,533
DYNAMO ELECTRIC DRIVING SET FOR VEHICLES
Filed July 20, 1923   5 Sheets-Sheet 2

Inventor

May 13, 1930.  F. PORSCHE  1,758,533
DYNAMO ELECTRIC DRIVING SET FOR VEHICLES
Filed July 20, 1923  5 Sheets-Sheet 3

Inventor
FERDINAND PORSCHE
By
Attorneys

May 13, 1930.  F. PORSCHE  1,758,533
DYNAMO ELECTRIC DRIVING SET FOR VEHICLES
Filed July 20, 1923   5 Sheets-Sheet 5

Inventor
Ferdinand Porsche

Patented May 13, 1930

1,758,533

UNITED STATES PATENT OFFICE

FERDINAND PORSCHE, OF STUTTGART-UNTERTURKHEIM, GERMANY, ASSIGNOR, BY MESNE ASSIGNMENTS, TO DAIMLER-BENZ AKTIENGESELLSCHAFT, OF BERLIN, GERMANY

DYNAMO-ELECTRIC DRIVING SET FOR VEHICLES

Application filed July 20, 1923, Serial No. 652,721, and in Austria July 29, 1922.

This invention relates to dynamo-electric driving sets of the type employed for driving automotive vehicles, and has for one of its principal objects to provide a new and improved dynamo-electric set of compact, sturdy and durable construction capable of being associated in an unitary structure with the internal combustion engine of an automobile. Another important object of the invention is to provide a dynamo-electric set so constructed and arranged that in addition to serving for the variable power transmission, it performs the functions of supplying current for the lighting system, of acting as the self-starter for the internal combustion engine, of the flywheel, of supplying the primary current for the ignition system, of the clutch, the brake and also provides for free running or coasting.

A further object of the invention is to provide simple and easily manipulated regulating members by means of which all of the above recited functions performed by the set are controlled, said regulating members also being constructively associated with the set as an unitary assembly.

Another object is to so construct and arrange said regulating members that the operation thereof is similar to that of the usual foot pedals and hand levers employed on the standard selective sliding gear transmission automobile having the customary clutch and the brake parts.

The above and other objects will appear more fully from the following more detailed description and by reference to the accompanying drawings forming a part hereof, wherein a satisfactory construction of a dynamo-electric driving set and control therefor embodying the principles of my invention is shown by way of example.

Figure 1:
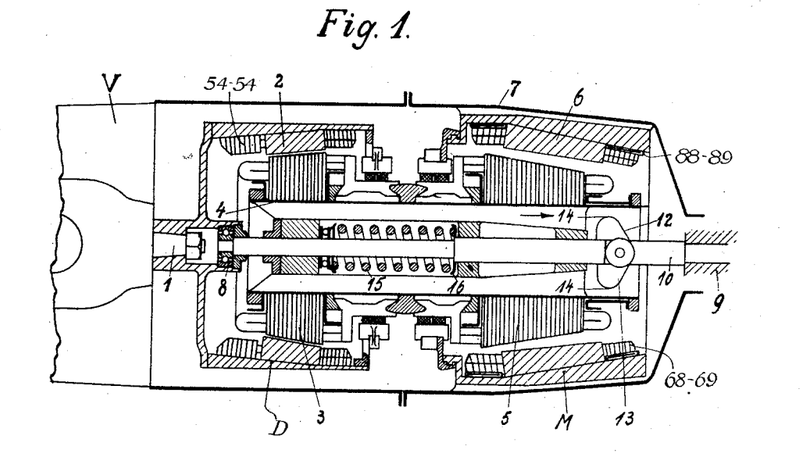
Fig. 1 is a central longitudinal section through the generator-motor set.

As shown in Fig. 1, the generator-motor set is connected to the crank shaft end 1 of an internal combustion engine diagrammatically indicated by the reference character V, the crank shaft 1 being securely connected to the rotating field magnet 2 of a continuous current series wound generator D. The armature 3 of said generator is keyed to a hollow shaft 4, on the other end of which shaft is secured in a like manner the armature 5 of a continuous current series wound motor M, the field 6 of which is rigidly and non-rotatably secured to the housing 7. The hollow shaft 4 is mounted upon a solid driving shaft 10 which is rotatably carried in the bearings 8 and 9 and is secured against longitudinal movement. Hollow shaft 4 is connected, by means presently to be described, to the solid shaft 10 in such a way that the hollow shaft will have, to a limited extent, both rotatable and longitudinal movement relatively to the solid shaft.

Figure 2:
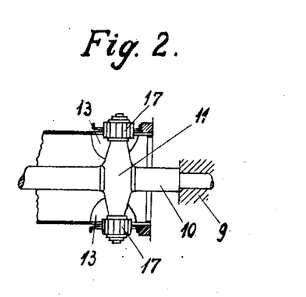
Fig. 2 is a sectional detail showing the operative connection between a pair of shafts upon which are mounted the rotary members of the set.

This means comprises a member 11 which will be termed a hammer head and which is securely associated with the driving shaft 10. This member, as shown most clearly in Fig. 2, consists of a pair of arms which project laterally from opposite sides of the shaft 10, and which arms carry at their extremities roller or ball bearings 17. These bearings 17 engage within a pair of oppositely situated slots or recesses 13 formed in the hollow shaft 4. As shown in Fig. 1, each of the recesses has one side thereof shaped to provide a curved cam surface 12 of predetermined definite curvature.

A spiral compression spring 15 is coiled about the shaft 10; one end of the spring 15, as shown in Fig. 1, abuts against the shoulder 16 on the driving shaft 10, and the other end of said spring abuts a collar secured to the hollow shaft 4 so that the spring 15 tends to move the shaft 4 in a direction opposite to that indicated by the arrow in Fig. 1, and thus to hold the curved cam surface 12 of the hollow shaft against the periphery of the bearings 17. When the parts are at rest, the spring 15 tends to hold the roller 17 normally in the position shown in Fig. 1 of the drawings, in which position it will be noted the bearings are located substantially at the midpoint of the curve 12. If now the hollow shaft 4 is set in rotation by the drive of the motor 10, the hammer head 11 and bearing 17 will move along the curve 12 until the tangential components, with respect to the shaft, of the force of compression of the spiral spring 15 (which in one direction of rotation is increased, and in the other is diminished, by the solenoid action of the field magnets of the electrical machines,) are in equilibrium with the circumferential force of the driving shaft 10. As will be clearly seen from Fig. 1 of the drawing, the spring 15 serves to exert a pressure which holds the periphery of the curved cam surface 12 resiliently against the periphery of the bearings 17. The curvature of the cam 12 is such that when the bearings move along the curve in either direction from the position shown in Fig. 1, a movement of the hollow shaft 4 longitudinally of the shaft 10 will occur. As will be seen from Fig. 1, the armatures 3 and 5 are of conical construction and have their basal surfaces turned towards each other; the field magnets 2 and 6 of said armatures are also of conical construction so that the air gap, and therewith the magnetic resistance of the one machine, is diminished by the longitudinal movement of the hollow shaft 12, and that of the second machine is increased. The curvature of the curve 12 is preferably made asymmetric with relation to the longitudinal axis of the set in such a manner that that half of the curve which is concerned with the one direction of rotation (forward drive) is more strongly curved than the other half for the other direction of rotation (backward drive), because the magnetic force of the rotating machines on the movable armature cores is added to the force of the spring 15 in the one direction of rotation and subtracted therefrom in the other direction. The necessary condition of equilibrium of the circumferential forces of the two shafts 4 and 10 is therefore obtained in accordance with the formula of the cam 12, which has a definite predetermined curvature. As will be readily understood from the foregoing description, the hammer head 11 with its cooperating parts, namely the bearings 17 and cam surface 12, in addition to serving to regulate automatically the turning moment, also forms what may be termed a clutch which is free from shocks and which prevents the road shocks to which the vehicle wheels are subjected from being transmitted to the set.

For controlling the various functions of the set, two switches are provided which are preferably associated with the set so as to form therewith an unitary assembly. One of these switches is constructed to be operated as a hand switch and the other as a foot switch, the manner of operation of the switches or their controlling levers being similar to the operation of the gear shifting hand lever and clutch foot pedal usually provided on automobiles. The hand or driving switch, as clearly shown in Figs. 3 to 6 inclusive, is actuated by a hand lever, which is moved in a manner similar to that of the usual gear shift lever for automobile selective, sliding gear transmissions, and said switch permits the individual switchings (starting, forward drive, backward drive, neutral position and braking) to be effected by moving the hand lever, as will presently be described in connection with the description of the switching diagrams.

Figure 3:
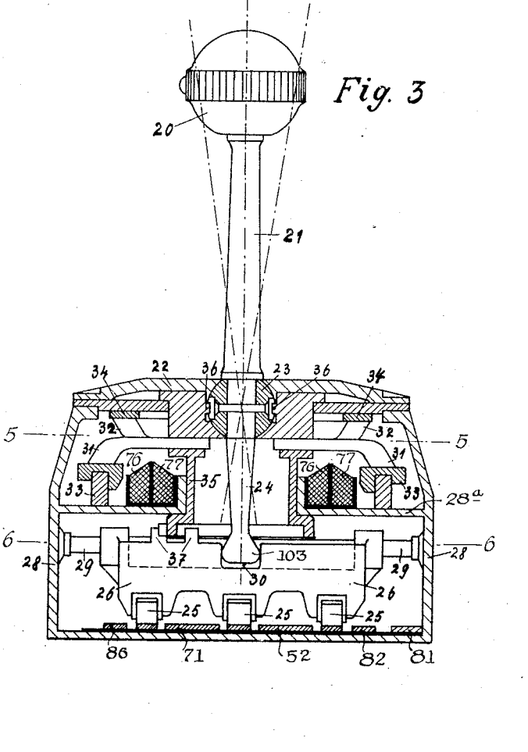
Fig. 3 is a central vertical section through the hand controlled switch.
Figure 4:
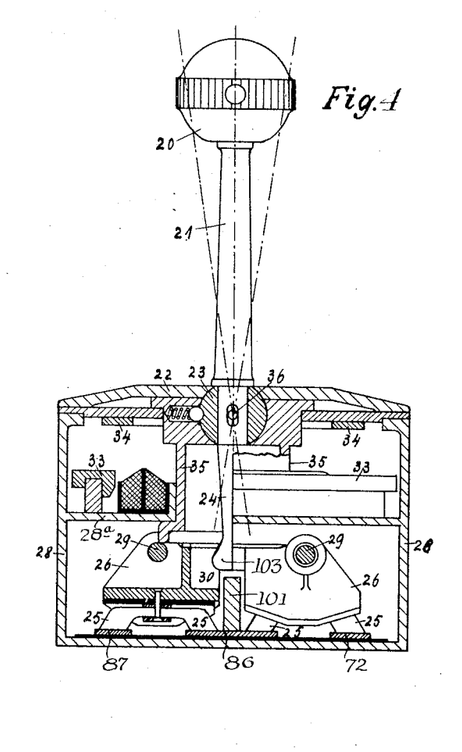
Fig. 4 is a view similar to Fig. 3, taken on a section line at right angles to that of Fig. 3.
Figure 5:
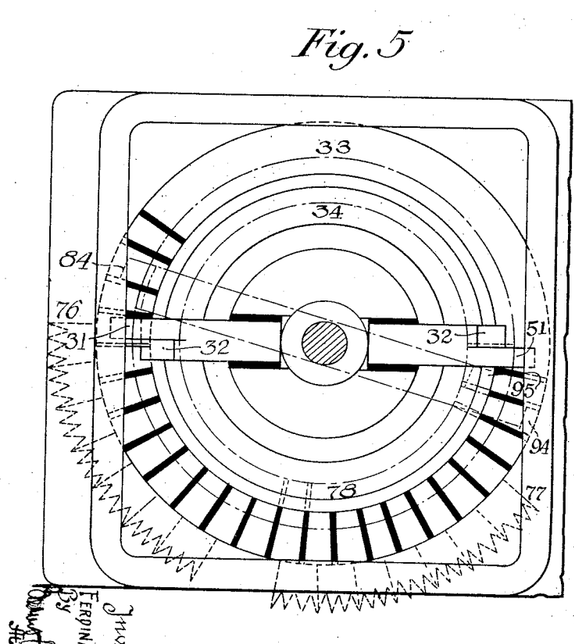
Figs. 5 and 6 are sections on the line 5—5 and 6—6 respectively of Fig. 3.
Figure 6:
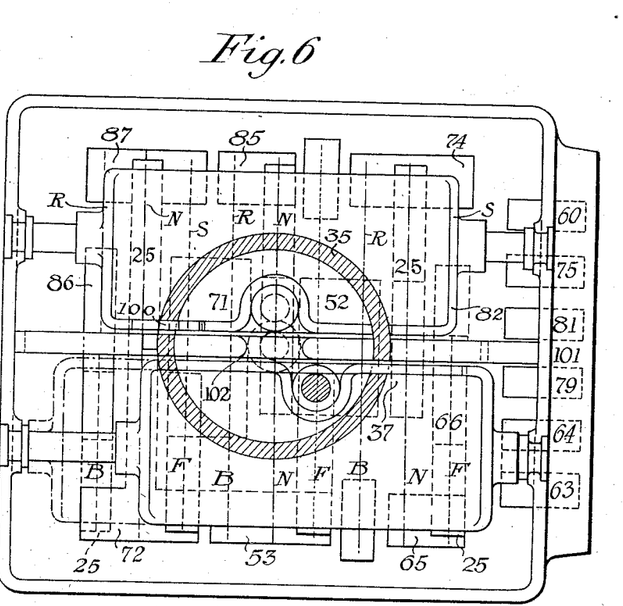

The hand lever 21, as clearly shown in Figs. 3 and 4, is provided at its upper end with a knob 20 and is pivotally supported upon a pin 36 in a bearing 23, the bearing 23 being of ball formation and rotatably supported in a similarly shaped ball socket formed within the cover 22 of the switch box 28 and a hollow cylinder 35. The mounting of the hand lever 21 is such that it may be swung in one plane upon the pin 36 as a pivot and in a plane at right angles thereto by rotation of the ball-shaped bearing 23 within its socket. The handle 21 extends through the bearing 23 to form an arm 24, the lower end of which terminates in a ball-shaped protuberance 103. Suitably secured within the switch box 28 to the bottom thereof are a number of electrical contacts 87, 85, 74, 86, 71, 52, 82, 66, 72, 53 and 65, suitably insulated from the switch box cover and spaced and insulated from each other. These contacts are arranged in spaced parallel rows, as indicated in Fig. 6 of the drawing and in Fig. 7 thereof, the contacts 87, 85 and 74 forming one row adjacent to one side of the switch box, the contacts 72, 53 and 65 forming a second row adjacent to the opposite side of the switch box, and contacts 86, 71, 52, 82 and 66 being arranged centrally of the switch box between the above-mentioned two rows. As shown in Figs. 3, 4 and 6, a pair of movable brush holders 26 are mounted within the switch box 28, one upon each side of the longitudinal center line of the box, each of said brush holders being slidably mounted upon a bolt 29 which extends through the switch box and is secured in the end walls thereof. Each brush holder carries three brushes 25 spaced from each other longitudinally of the bolt 29 and brush holder 26, and said brushes, as clearly shown in Fig. 4, are formed somewhat in the shape of an inverted U and are adapted to span the space between the central row of contacts above referred to and the side row of contacts with which each set of brushes is intended to cooperate. Each of the brush holders 26 is provided midway between its ends with a recess 30 or any equivalent structure, in which the ball end 103 of the arm 24 is adapted to be interlocked so that by manipulating the hand lever in the manner hereinafter to be described, either brush holder 26 may be slid along its bolt 29 to bring its set of brushes 25 into different set positions to effect the various individual switching positions of the set. When the lever 21 is in the vertical, or neutral, position, shown in Figs. 3 and 4 of the drawings, the lower end 24 of the lever 21 is out of engagement with the brush holders 26; when, however, the lever 21 is inclined either to the right or the left (Fig. 4) to the positions indicated by the dot and dash lines in said figure, the end 103 of the arm 24 is brought into interlocking engagement with the recess 30 of one of said brush holders. After the lever 21 has been so inclined, movement thereof either forwardly or rearwardly (to the right or left of Fig. 3) will cause the brush holder with which the end 103 has been engaged to be slid along the bolts 29 to bring the brushes into their various set positions.

Four different individual switchings are accomplished in this manner, which switchings correspond with the four functions of the set, namely, starting, forward driving, reverse, and braking. These four switching positions of the brushes 25 are indicated in Figs. 6 and 7 of the drawing by the reference characters S, F, R and B respectively, while the neutral position is indicated by the reference character N.

Figure 7:
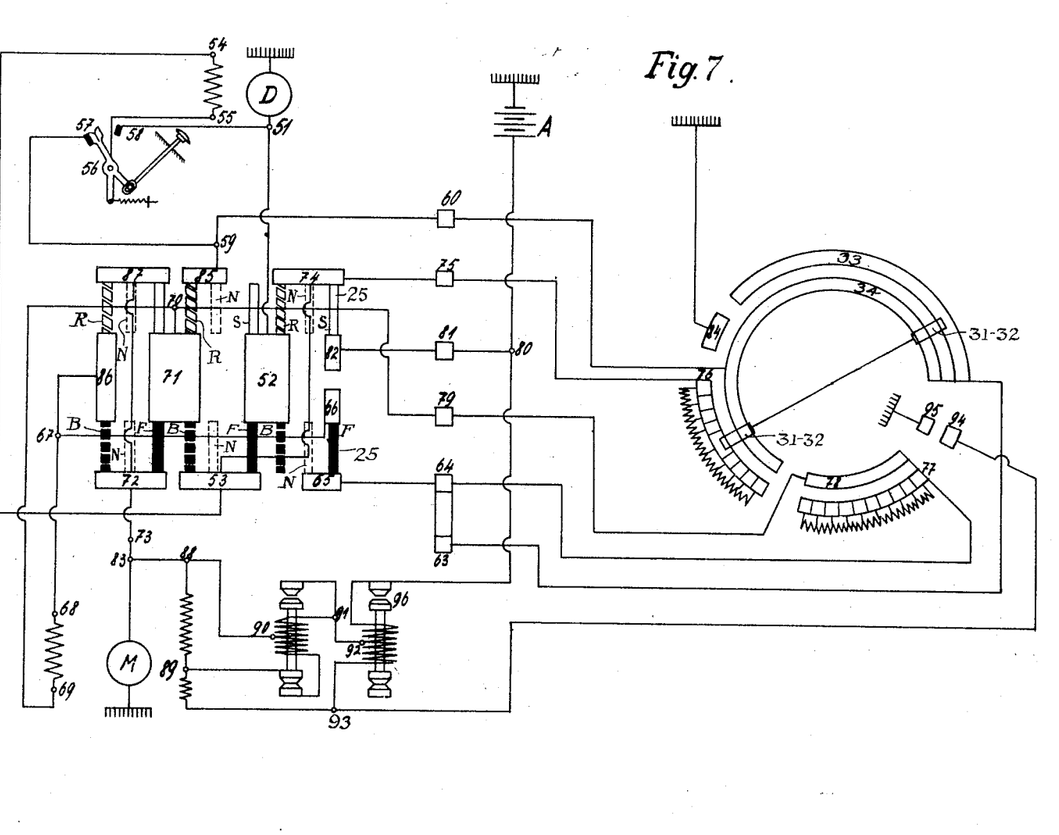
Fig. 7 is a wiring diagram of the electrical connections.

The switch box is provided with a plurality of binding posts 60, 75, 81, 79, 64 and 63 which are connected with the various contacts of the switch box hereinbefore described, and with the other members of the electrical system in the manner indicated in the diagrammatic showing of Fig. 7. In order to regulate the current passing through the electrical system for the individual switchings of the hand lever 21, the switch box 28 is provided with a second set of contacts 33, 34, 94, 95, 77, 78, 76 and 84 with which a set of brushes 31, 32 are adapted to cooperate. The connections of this last-mentioned group of contacts with the binding posts above referred to and the other parts of the electrical system, are clearly indicated in Fig. 7 of the drawing.

In the particular constructional example illustrated, the contacts 33, 94, 77, 76 and 84 are mounted upon a horizontal web or partition 28ª of the switch box, and the contacts 34, 95 and 78 are carried by the cover 22 of said switch box. The connections between these contacts are effected by the brushes 31 and 32, carried by radial arms secured in, and suitably insulated from, the hollow cylinder 35. The outer end of each radial arm is bifurcated and bent to form a downwardly extending portion to which is secured the brush 31 which is adapted to wipe across the contacts carried by the web 28ª, and an upwardly extending portion to which is secured the brush 32 which is adapted to wipe across the contacts carried by the cover 22. The switching performed by the brushes 31, 32 is effected by rotating the lever 21 about its longitudinal axis, this rotation of the lever being communicated by the pin 36 to the hollow cylinder 35.

The arrangement of contacts 33, 34, 94, 95, 76, 77, 78 and 84, more fully indicated in the wiring diagram (Fig. 7) allows, by means of suitable resistance switching, one resistance to be switched-in in parallel with the field of the generator and the other in parallel with the field of the motor, so that within definite limits, the turning moment of the internal combustion engine necessary, in consequence of the driving conditions present at any time (alteration of fuel, alteration of the atmospheric pressure at different altitudes, reduction of power of the internal combustion engine owing to engine troubles, or other like causes) is always adapted to these conditions. Furthermore, the braking action is influenced and regulated by a similar alteration of resistance, and moreover in the terminal position of rotation the dynamo D is short-circuited and works with but little or no slip as an electric clutch, so that a direct transmission of the mechanical energy to the driving shaft 10 is possible without the intervention of the electromotor M (direct working) as is more fully described below.

In order to prevent a change from one of the main individual switching positions to another of such positions, except at such times as the above mentioned resistances have been short-circuited, so that the machine will be free from electrical pressure, and to prevent sparking or arcing when such switching changes are made, means are provided for preventing the forward or backward movement of the lever 21 except when the brushes 31, 32 have been moved to their terminal positions. This means consists of a pair of recesses 100 provided in the lower edge of the hollow cylinder 35, one of said recesses being provided for each brush holder. Each brush holder is provided with a pair of stops 37 which, as shown in Figs. 3 and 6, are so constructed and arranged that they will pass through their respective recess 100 only when the handle 21 has been rotated to bring the brushes 31, 32 to their definite short-circuited position, and which, in any other of the rotational positions of the handle 21, will engage with the lower edge of the hollow cylinder 35 and lock their respective brush holders against forward or backward movement.

For the starting and switching-off functions of the set, I provide a switch of the snap type, illustrated somewhat diagrammatically at 56—57—58 in Fig. 7, which switch is preferably firmly connected with the set and is adapted to be actuated by a foot lever. To this switch, the following duties are assigned:

First: In the starting position of the driving switch, to maintain the connection between the battery A and the dynamo or generator D, the latter being switched-in as a starting motor for the purpose of starting the internal combustion engine V, as long as the foot switch is depressed.

Second: To render it possible at any time for the driver intentionally to interrupt, on the one hand the transmission of power from the internal combustion engine to the driving shaft, both in forward and also in backward driving, and on the other hand, the transmission of power from the vehicle to the dynamo-electric set (brake).

The wiring diagram of the installation is shown in Fig. 7, and the manner in which the circuits are completed, through the necessary contacts and branch lines, for the various individual operative switchings are indicated in Figs. 8 to 14 inclusive, the same reference numerals being used throughout to indicate the same parts. In Fig. 7 the numerals 54, 55 indicate the excitation of the generator, and 68, 69 that of the motor. The lines leading upwards and downwards from the contacts 86, 71, 52, 82 and 66 represent the electric connections effected for the various switching positions of the two brush systems 25 of the hand driving switch. The dot and dash lines, adjacent to which the reference character N appears, indicate the positions of the brushes 25 for the neutral position of the hand lever 21; the light full lines S leading to the contacts 87, 85 and 74 indicate the positions of the brushes for starting; the diagonally lined light lines R indicate the reverse or backward driving position; the heavy full lines F leading downwards to the contacts 72, 53 and 65 indicate the position for forward driving, and the heavy broken lines B indicate the position for braking. For the sake of clearness the contacts 33, 34, 84, 76, 77, 78, 94 and 95, which are brought into conducting relation by the rotation of the hand lever 21 about its own axis, have been drawn separately at the right hand side of the figure.

The contacts 94 and 95 when placed in communication by such rotation of the hand lever cause, through a quick-acting solenoid switch and circuit 90, 91, 92, 93 and 96, the excitation of an auxiliary winding 88, 89 of the motor M. The binding posts of the switch box 28 are indicated by the numerals 60, 75, 81, 79, 64 and 63.

Figure 8:
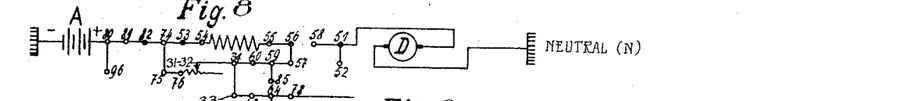
Fig. 8 is an across-the-line diagram corresponding to Fig. 7.
Figures 9, 10:
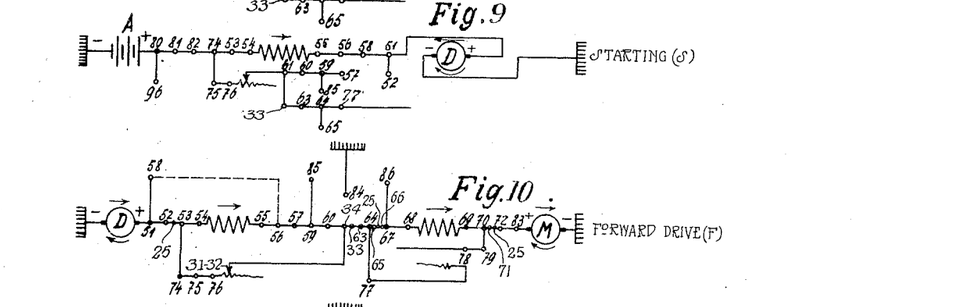
Figs. 9, 10, 11, 12, 13 and 14 are views similar to Fig. 8 and showing the circuits for the various set positions of the switches which correspond respectively to "starting," "forward drive," "forward, increased speed", "reverse," "braking," and "free running" or "coasting."

With the switch in the neutral position, the brushes 25, being in the position N, are engaged with the contacts 82, 74, thus causing current from the battery A to flow through the wires which connect the contact 74 and the contact 53 and which connect the latter to the field 54, 55 of the generator D, the circuit completed being from battery A through contacts 80, 81, 82, brushes 25, contacts 74, 53, field 54, 55, contacts 56, 57, 59, 60, 34, 31, 32, 76, 75, back to the line through contacts 75 and 74, as shown diagrammatically in Fig. 8. If now the foot switch is depressed to close the contacts 56, 58, the current from the battery passes through the generator and its field in the series, the current flowing from the battery A through the contacts 80, 81, 82, brushes 25, contacts 74, 53, field 54, 55, contacts 56, 58, 51 and armature of the generator to ground, as shown in Fig. 9. The driving shaft 10 being held stationary, the field magnet 2 of the generator will be rotated, and as it is connected to the crank shaft 1 of the engine V, said crank shaft will be rotated to start the engine.

After the engine starts, the foot switch is released, and the hand lever 21 is actuated to bring the lower set of brushes 25 to the position F (Fig. 7), the circuit as illustrated in the diagram of Fig. 10 being from the generator through contacts 51, 52, lower brushes 25, contact 53, to the generator field 54, 55, thence through contacts 56, 57, 59, 60, 34, brushes 32, 31, to contacts 33, 63, 64, 65, brushes 25, contacts 66, 67, motor field 68, 69, contacts 70, 71, brushes 25, contacts 72, 83, through the motor armature to ground. The field 2, now rotating with the speed of revolution of the internal combustion engine, will carry the armature 3 with it to an extent corresponding with the cam surface 12 of the recess 13. But, since before the commencement of the driving of the driving shaft 10 the hammer head 11 is stationary and the armature shaft 4 is held fast by the hammer head at a definite point of the curve 12, the field 2 of the generator rotates at a high speed of revolution, as compared with the stationary armature 3, and thus, the generator produces the maximum strength of current. This current is led to the motor M which now begins to work with a small air gap, and consequently, with high induction. When the moment of attraction has become sufficiently large, the driving shaft 10 will be set in motion. Now since the armatures of the motor and generator are keyed to a common shaft 4, the generator armature 3 consequently rotates at a definite speed which, however, is much less than the speed of revolution of the generator field 2, so that during the starting and at any time until the vehicle has reached its greatest speed, continuous current is generated by the dynamo and flows to the motor, as described above, and as shown in Figs. 10 and 11. Meanwhile, the turning moment, most favorable at any time, demanded from the internal combustion engine, having regard to the variable resistances, is automatically obtained owing to the fact that with increased resistance the transmission of power between the two shafts 4 and 10 is not effected at the right hand point, Fig. 1, of the curve 12, but the lagging of the hammer head as the bearings 17 roll along the curve and approach the point 14, produces a movement of the hollow shaft 4 in the direction of the arrow (Fig. 1) and thus brings about an alteration of the air gaps of the two electrical machines. By the diminution of the magnetic resistance of the motor, its speed of revolution and also the current strength raised by the increased loading, is reduced. At the same time, owing to the enlargement of the air gap of the generator, its field is weakened and the turning moment necessary for a definite current is reduced, with the result that the turning moment most favorable to be given by the internal combustion engine, is automatically maintained.

Figure 11:
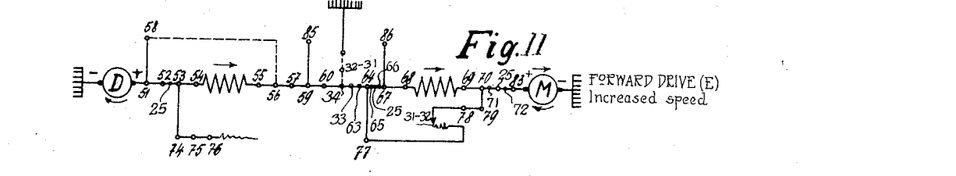

The diagram of Fig. 10 of the drawings illustrates the circuit which corresponds to a position of the hand lever 21 in which the lowermost set of brushes 25 are in the position F of Figs. 6 and 7, and before the hand lever has been rotated about its longitudinal axis to vary the resistances. With the lever in this position, it will be noted that the field 54—55 of the dynamo is shunted by the circuit 74, 75, 76, 34. Rotation of the hand lever about its longitudinal axis will cause the resistances of the dynamo shunt to be switched in and will produce an increase in the current generated by the dynamo, with a consequent delivery of a greater current to the motor and therefore an increase in speed of the vehicle. If a further increase of speed is desired, the rotation of the hand lever 21 about its axis is continued to bring the pair of brushes 31, 32 into engagement with the contacts 78, 77, whereby the dynamo shunt is switched out and the motor field is switched in, as indicated in Fig. 11. The continued rotation of the hand lever will cause all of the resistances in the motor field shunt to be cut out until the maximum speed through the motor-shunt is obtained. When the vehicle has attained its maximum speed through the motor-shunt circuit, a further rotation of the hand lever will bring one pair of the brushes 31—32 into engagement with the contacts 94, 95, while the other pair will be in conducting relationship with the contacts 34, 84. The latter contacts switching out the motor M and producing a direct drive from the engine V to the shaft 10, the armature of the dynamo D operating with the rotating field 2 as an electric clutch, while the placing of the contacts 94, 95 in conducting relationship, causes the solenoid switch 90, 91, 92, 96 to be thrown in, thus completing the circuit through the auxiliary winding 88, 89 of the motor and the battery A. The motor now operating as a generator, and with the help of the auxiliary winding 88, 89 on the field poles, automatically regulated in the known manner, gives out a constant voltage for charging the battery A, which battery is utilized for providing current for the illumination of the vehicle and for the ignition system of the internal combustion engine.

Figure 12:
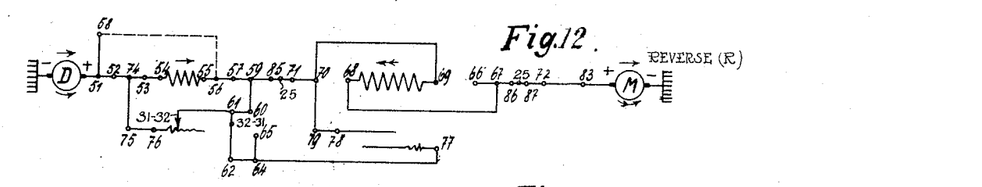

Backward or reverse driving is achieved by moving the hand switch to bring the upper set of brushes 25 (Fig. 7) to the position R, thus reversing the direction of rotation of the electro-motor by changing the polarity, and simultaneously weakening the field of the generator, the circuit as shown in Fig. 12 being from the generator to contacts 51, 52, brushes 25, contact 74, from which point the current branches, part passing through the contact 53 to the field 54, 55, contacts 56, 57 and 59, and the other part being a shunt, from the contact 74 to the contact 75, 76, and dynamo shunt, thence through the brushes 31, 32 to the contact 34 and contact 60 to join again at the contact 59, from which point the current passes to the contact 85 through the brushes 25, contacts 71, 72, through the field 69, 68, contacts 67, 86, 87, 72, 83, through the motor armature to ground. The regulation of the mechanism for reversing is effected as hereinbefore described by means of the cam surface 12, except that the curvature of said cam is preferably made flatter in the half concerned with backward driving.

Figure 13:
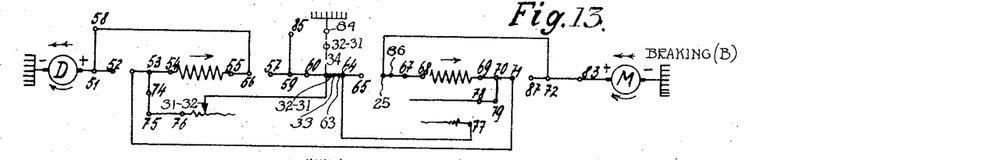
Figure 14:
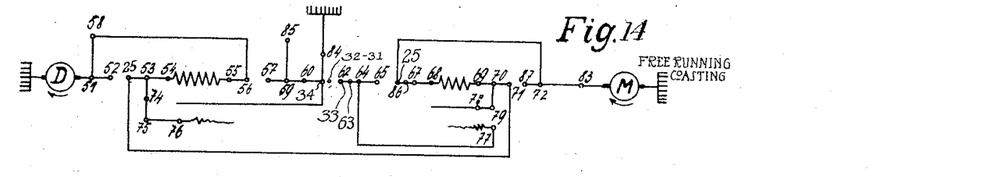

When the hand lever 21 is moved to the braking position in which the lower brushes are in the position B, the polarity of the motor field and also that of the generator field is reversed so that the motor M works as a generator and the generator D as a motor in such manner that the energy supplied by the vehicle (downhill running or braking) is electrically transmitted to the internal combustion engine, in which process the light running work of the internal combustion engine and the electrical transmission losses represent the braking resistances of which the latter can be increased or altered by the switching-in of the resistances 76, 77 by a turning of the hand lever 21 about its longitudinal axis. When the hand switch is set to the position B for braking, as indicated in the diagram of Fig. 13, the current flows from the motor M to the contacts 83, 72, 86, 67 through the field 68, 69, to the contacts 70, 71, brushes 25, contacts 53, generator field 54, 55 (generator D now acting as a motor), contacts 56, 58 and 51, through the armature of the generator D to the ground.

The constructive union of the above mentioned regulating organs with the driving set is effected in such a manner that hand and foot switches are built on, with appropriately provided fitting surfaces, directly to the actual electrical driving set, fully enclosed and in such a manner that by these means there is attained a very short and enclosed cable connection, in order to prevent the cables and their points of connection from getting dirty or injured and also to avoid unnecessary resistance losses.

This constructive union is of essential importance for the reliable operation of rapid power driven vehicles, in which the parts concerned are exposed to dust and dampness. Finally the function of free running may be attained with the set in the simplest manner.

In known power driven vehicles the fuel consumption is increased unnecessarily by the fact that, particularly in the case of journeys in country with varying gradients, gas must be continuously admitted, the motor driving the vehicle by means of the clutch and the variable gear. On all downhill sections, curves, and sections with limited view, the admission of gas is throttled, the kinetic force of the vehicle again driving the motor through the clutch and the gear, and the motor, in consequence of its light running work, acting as a brake, and thus wasting power and using fuel.

Meanwhile, it is impossible in ordinary vehicles always to adapt the clutch to the manner of movement concerned (motor driving or driven) and accordingly they are driven almost exclusively with the clutch in, so that the motor remains continuously connected with the axle drive. Meanwhile the petrol motor, in so far as it is driven by the vehicle, must always make the large number of revolutions which is given by the speed of travel prevailing and the gear in operation. It has therefore previously been proposed to introduce in the usual power driven vehicles a mechanical free running device between the clutch and the variable gear. According to this invention this advantage is achieved without any switching or brake arrangement, as is more fully described below.

Since the dynamo and the electro-motor work as series wound machines, excitation can only arise in one direction of rotation and consequently transmission of power from the vehicle (from the driving shaft 10) to the internal combustion engine is not possible without alteration of the switching (brake switching).

If, in the case of downhill travel, the motor which has become a generator is not switched over, it gives off no current to the generator G which has become a motor, in consequence of which there is automatically attained the function of free running in the transmission and, by the complete stopping of the internal combustion engine thus caused, a considerable saving of fuel.

What I claim is:—

1. A dynamo-electric set, comprising as a unitary assemblage a rotary field, a stationary field and a pair of rotatable armatures mounted upon a common shaft, one for each of said fields, the opposed surfaces of each cooperating field and armature being conical, and means including a cam having a definite predetermined asymmetric curvature for effecting automatically an axial movement of said armatures in unison corresponding to variations in the torque exerted by variations of the driving resistance opposed to said set, said cam being constructed and arranged to produce such axial movement irrespective of the direction of rotation of said armatures, and a power element cooperating with the armatures and opposing the axial movement of the armatures in one direction but assisting their movement in the opposite axial direction.

2. A dynamo-electric set, comprising as a unitary assemblage a rotary field, a stationary field and a pair of rotatable armatures, a pair of relatively movable elements, one of which is provided with a cam surface having a definite, predetermined asymmetric curvature, an operative connection between said cam surface and said other element for producing an automatic movement, in unison, of said armatures in accordance with change in the torque which must be exerted by said set to overcome variations in the resistance offered to the rotation thereof, said cam being constructed and arranged to produce such axial movement irrespective of the direction of rotation of said armatures, and a power element operatively associated with said armatures for opposing the movement of the armatures in one direction but assisting their movement in the opposite direction.

3. The combination with an internal combustion engine of an automotive vehicle, of a combined generator and motor set, having one element thereof connected to said engine, a second element stationary and a pair of elements connected with the driving wheels of the vehicle, a hand-operated switch directly connected with said set to form therewith an unitary assemblage, connections from said switch to said set arranged in one position of said switch to connect certain of said elements in series to actuate said vehicle and when in another position to reverse the polarity of certain of said elements whereby the energy due to the motion of said vehicle will be transmitted to said engine to exert a braking effect, and other connections from said hand switch to a plurality of resistances whereby the said braking effect may be altered.

4. The combination with an internal combustion engine of an automotive vehicle, of a combined generator and motor set, having one element thereof connected to said engine, a second element stationary and a pair of elements connected with the driving wheels of the vehicle, switch mechanism and connections therefrom to said set arranged to connect certain of the elements of said set in series to actuate said vehicle, an electrical storage battery connected with one of said elements, said last named element being provided with an auxiliary winding to maintain a constant voltage in said element during the charging of said battery and an automatic relay for making such winding effective when said switch mechanism is adjusted to full forward driving position.

5. A dynamo-electric set, comprising as a unitary assemblage a rotary field, a stationary field and a pair of rotatable armatures one for each of said fields, a hollow shaft common to both armatures, the opposing surfaces of each of said armatures being conical, said hollow shaft being provided with a recess bounded by a curve, a drive shaft having connecting members engaging said recess for the automatic axial movement of said armatures in unison, corresponding to the change in the torque produced by the change in the resistance to rotation of said drive shaft, and a power element cooperating with the armatures which opposes the movement of the armatures in one direction but assists their movement in the opposite direction.

6. A dynamo-electric set, comprising as a unitary assemblage a rotary field, a stationary field, and a pair of rotatable armatures, one for each of said fields, a hollow shaft common to both armatures, the opposing surfaces of each of said armatures being conical, said shaft having a recess bounded by a curve, a drive shaft held against axial movement provided with connecting members engaging said recess for the automatic axial movement of said armatures in unison, corresponding to the change of torque produced by the change of resistance to the rotation of said drive shaft, and a spring located within the hollow shaft and bearing against said drive shaft, said spring assisting the movement of the hollow shaft in one direction but opposing its movement in the other direction.

7. A dynamo-electric set, comprising as a unitary assemblage a rotary field, a stationary field and a pair of rotatable armatures one for each of said fields, a hollow shaft common to both armatures, the opposing surfaces of each of said armatures being conical, said hollow shaft being provided with an internal unsymmetrical recess bounded by a curve, a drive shaft held against axial movement and provided with connecting members engaging said curve for producing an automatic axial movement of said armatures in unison irrespective of their direction of rotation and corresponding to the change in torque produced by the change in resistance to the rotation of said drive shaft, and a spring arranged within the hollow shaft and bearing against the drive shaft.

8. A dynamo-electric set, as set forth in claim 4, in which the auxiliary winding of said one element is a supplementary shunt coil for the field poles of the electro motor, a rheostat with which said shunt coil and the main coil of the motor is connected and said rheostat including means to throw said main coil out of circuit and said shunt coil automatically into circuit upon the attainment of a predetermined speed, for the purpose of charging the battery with a current of constant voltage.

9. The combination with an internal combustion engine of an automotive vehicle, of a combined generator and motor set having one element thereof connected to said engine, a second element secured in a stationary position, and a pair of elements connected with the driving wheels of the vehicle, shunt elements in the fields of said generator and motor, a single manually operated switch and connections from said switch to said set to cause the elements of said set to be actuated for starting the internal combustion engine to connect certain of said elements in series for forward driving, for reversing the polarity of certain of said elements for backward driving, to cause the elements to exert a braking effect, and to regulate variable resistances in the generator and motor field shunt.

10. The combination with an internal combustion engine of an automotive vehicle, of a combined generator and motor set having one element thereof connected to said engine, a second element secured in a stationary position, and a pair of elements connected with the driving wheels of the vehicle, shunt elements in the fields of said generator and motor, a single manually operated switch constructed and arranged to be actuated in a manner strictly analogous to the actuation of the gear shifting lever of a selective sliding gear transmission of an automobile, and connections from such switch to cause the elements of said set to be operative for starting the internal combustion engine when said switch lever is in neutral position, a foot actuated switch for causing said elements to be operative for starting the engine when said first named switch is in neutral position, first named switch also serving to connect certain of said elements in series for forward driving, for reversing the polarity of certain of said elements for backward driving, for causing said elements to exert a braking effect, and for regulating the variable resistances in the generator and motor field shunts.

In testimony whereof I affix my signature.

FERDINAND PORSCHE.